United States Patent
Hojo et al.

(10) Patent No.: US 10,544,729 B2
(45) Date of Patent: Jan. 28, 2020

(54) ABNORMALITY DETERMINING VALVE CONTROL DEVICE AND SYSTEM

(71) Applicants: KEIHIN CORPORATION, Tokyo (JP); HONDA MOTOR CO., LTD., Tokyo (JP)

(72) Inventors: Sachio Hojo, Tokyo (JP); Youichiro Shikine, Tokyo (JP); Tetsuo Yamashita, Hiroshima (JP); Shigeki Yoshitake, Tokyo (JP); Kensuke Yamamoto, Utsunomiya (JP); Akihito Inoue, Nasukarasuyama (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 54 days.

(21) Appl. No.: 15/559,198

(22) PCT Filed: Mar. 24, 2016

(86) PCT No.: PCT/JP2016/059368
§ 371 (c)(1),
(2) Date: Sep. 18, 2017

(87) PCT Pub. No.: WO2016/152970
PCT Pub. Date: Sep. 29, 2016

(65) Prior Publication Data
US 2018/0112592 A1    Apr. 26, 2018

(30) Foreign Application Priority Data

Mar. 26, 2015 (JP) ................. 2015-064674

(51) Int. Cl.
*F02B 37/18* (2006.01)
*F02D 41/06* (2006.01)
*F02D 41/22* (2006.01)

(52) U.S. Cl.
CPC .......... *F02B 37/186* (2013.01); *F02D 41/062* (2013.01); *F02D 41/221* (2013.01); *F02D 41/222* (2013.01); *F02D 2200/021* (2013.01)

(58) Field of Classification Search
CPC ..... F02B 37/18–186; F02B 39/16–168; Y02T 10/144; F02D 41/222
See application file for complete search history.

(56) References Cited

U.S. PATENT DOCUMENTS 6,012,289 A    1/2000  Deckard et al.
2006/0207526 A1*  9/2006  Kassner .............. F02D 41/0007
                                                            123/1 R (Continued)

FOREIGN PATENT DOCUMENTS

CN    101603455 A    12/2009
JP    62-6431 U    1/1987

(Continued)

OTHER PUBLICATIONS

International Search Report & Written Opinion dated Jun. 14, 2016 corresponding to International Patent Application No. PCT/JP2016/059368, and English translation thereof.

(Continued)

*Primary Examiner* — Laert Dounis
(74) *Attorney, Agent, or Firm* — Squire Patton Boggs (US) LLP

(57) ABSTRACT

A valve control device controls a valve drive mechanism on the basis of a degree-of-opening signal for a valve and a startup signal for an engine, and includes: a drive signal generating unit that, when it is determined on the basis of the startup signal that the engine is stated, generates a test drive signal for test-driving the valve before the generation of a normal drive signal associated with normal driving of the valve; and an abnormality determining unit that, on the basis of the degree-of-opening signal during the test driving, (Continued)

determines whether or not an abnormality has occurred in the drive mechanism. The drive signal generating unit stops generating the test drive signal and the normal drive signal when the abnormality determining unit determines that the abnormality has occurred in the drive mechanism.

6 Claims, 4 Drawing Sheets

(56) References Cited

U.S. PATENT DOCUMENTS

| | | | | |
|---|---|---|---|---|
| 2012/0191321 A1* | 7/2012 | Ibuki | ............... | F02B 37/004 |
| | | | | 701/102 |
| 2012/0209496 A1* | 8/2012 | Miyashita | ......... | F02D 41/0007 |
| | | | | 701/102 |
| 2016/0108803 A1* | 4/2016 | Ono | ............... | F02D 41/221 |
| | | | | 60/602 |
| 2017/0314493 A1* | 11/2017 | Yoeda | ............... | F02B 37/183 |
| 2018/0119607 A1* | 5/2018 | Ono | ............... | F02B 37/12 |

FOREIGN PATENT DOCUMENTS

| | | | |
|---|---|---|---|
| JP | 2001-065374 A | | 3/2001 |
| JP | 2001065374 A | * | 3/2001 |
| JP | 2004-332613 A | | 11/2004 |
| JP | 2004332613 A | * | 11/2004 |
| JP | 2008-095587 A | | 4/2008 |
| JP | 2008-106725 A | | 5/2008 |
| JP | 2010-151085 A | | 7/2010 |
| JP | 2010151085 A | * | 7/2010 |
| JP | 4844335 B2 | | 12/2011 |
| JP | 2013096372 A | * | 5/2013 |

OTHER PUBLICATIONS

Chinese Office Action corresponding to Application No. 201680016752.4, dated Jan. 2, 2019.

Chinese Office Action corresponding to CN Appln. No. 201680016752.4, dated Jul. 24, 2019.

Xincai Zhang, "Maintenance Manual of New-style Sumitomo Excavator" (Book I), Liaoning Science and Technology Publishing House, pp. 164-165.

* cited by examiner

ABNORMALITY DETERMINING VALVE CONTROL DEVICE AND SYSTEM

TECHNICAL FIELD

The present invention relates to a valve control device and a valve system.

Priority is claimed on Japanese Patent Application No. 2015-064674, filed on Mar. 26, 2015, the content of which is incorporated herein by reference.

BACKGROUND ART

As is commonly known, a wastegate valve is a type of control valve provided on a bypass passage for engine exhaust gas in a supercharger, and is for properly controlling a supercharging pressure of combustion air supplied to an engine. For example, a wastegate valve control device for a supercharger-equipped internal combustion engine disclosed in Patent Literature 1 below controls an air bypass valve when an abnormality has occurred in a drive mechanism for a wastegate valve and thereby copes with the abnormality.

CITATION LIST

Patent Literature

[Patent Literature 1]
Japanese Unexamined Patent Application, First Publication No. 2004-332613

SUMMARY OF INVENTION

Technical Problem

Meanwhile, a technique of Patent Literature 1 can be applied to an engine in which an air bypass valve is provided for an exhaust system, and thus cannot be applied to an engine having no air bypass valve. Accordingly, development of a technique capable of coping with the abnormality in the drive mechanism for the wastegate valve regardless of whether or not the air bypass valve is present is keenly desired.

An aspect of the present invention was made in view of the above circumstances, and an object thereof is to provide a valve control device and a valve system capable of coping with an abnormality in a drive mechanism of a target valve without using a separate valve such as an air bypass valve.

Solution to Problem

To solve the above technical problems to achieve the related object, the present invention adopts the following aspects.

(1) A valve control device of an aspect according to the present invention controls a drive mechanism of a valve on the basis of a degree-of-opening signal for the valve and a startup signal for an engine, and includes: a drive signal generating unit configured to, when it is determined on the basis of the startup signal that the engine is started, generate a test drive signal for test-driving the valve before generation of a normal drive signal associated with normal driving of the valve; and an abnormality determining unit configured to determine, on the basis of a degree-of-opening signal during the test driving, whether or not an abnormality has occurred in the drive mechanism. When the abnormality determining unit determines that the abnormality has occurred in the drive mechanism, the drive signal generating unit stops generating the test drive signal and the normal drive signal.

(2) In the aspect according to (1) above, the abnormality determining unit may determine whether or not a coolant temperature of the engine is lower than or equal to a freezing temperature on the basis of a temperature signal indicating the coolant temperature, and determine that a freezing abnormality has occurred in the drive mechanism when the coolant temperature is lower than or equal to the freezing temperature and the degree of opening of the valve does not follow a control target value during the test driving for a predetermined period.

(3) In the aspect according to (1) or (2) above, the abnormality determining unit may determine whether or not a temperature sensor for detecting the coolant temperature of the engine is abnormal on the basis of a sensor failure signal indicating an abnormality in the temperature sensor, and may cause the drive signal generating unit to generate a drive signal having a level at which the drive signal can be continuously supplied to the drive mechanism when the temperature sensor is abnormal.

(4) In the aspect according to any one of (1) to (3) above, when it is determined on the basis of the startup signal that the engine is stopped, the drive signal generating unit may generate a drive signal that puts the valve in a fully closed state.

(5) In the aspect according to any one of (2) to (4) above, when the abnormality determining unit determines the freezing abnormality, the drive signal generating unit may stop generating the test drive signal and the normal drive signal, and then resume the generation of the normal drive signal when it is determined on the basis of the temperature signal that the coolant temperature is higher than the freezing temperature.

(6) In the aspect according to any one of (1) to (5) above, the valve may be a wastegate valve provided for a supercharger of the engine.

(7) A valve system of another aspect according to the present invention includes: a valve; a drive mechanism; and a valve control device according to any one of (1) to (6) above.

Advantageous Effects of Invention

According to the aspects of the present invention, the test drive signal for test-driving the valve is generated before the generation of the normal drive signal of the valve, it is determined whether or not the drive mechanism is abnormal on the basis of the degree-of-opening signal during the test driving using the test drive signal, and the generation of the test drive signal and the normal drive signal is stopped when the drive mechanism is abnormal. For this reason, the valve control device and the valve system can cope with the abnormality in the drive mechanism of the target valve without using a separate valve such as an air bypass valve.

DESCRIPTION OF EMBODIMENTS

Hereinafter, an embodiment of the present invention will be described with reference to the drawings.

Figure 1:
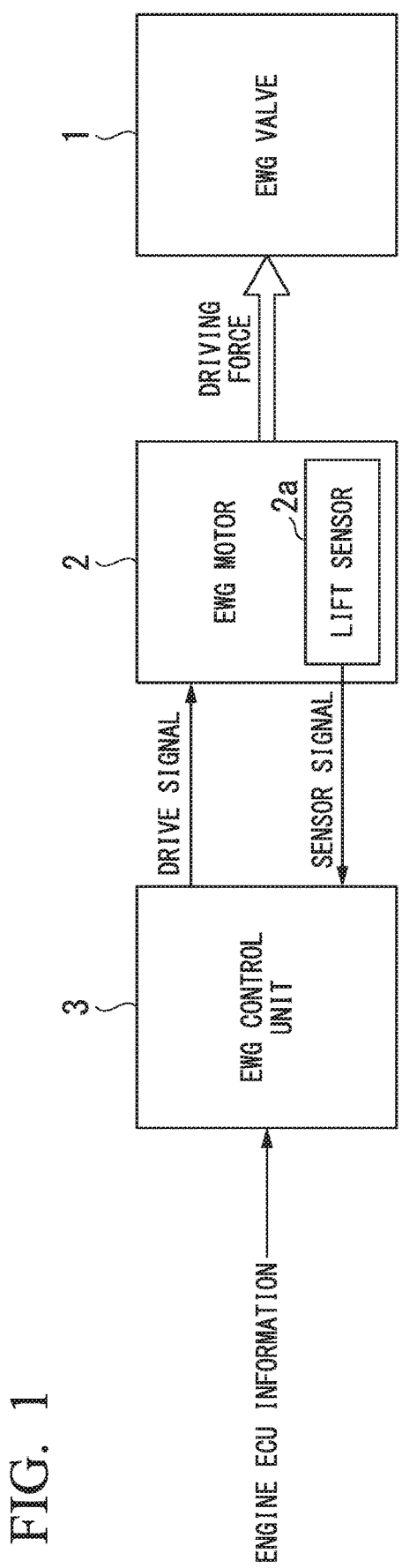
FIG. 1 is a block diagram illustrating a functional constitution of a valve system according to an embodiment of the present invention.

A valve system and valve control device according to the present embodiment include, as illustrated in FIG. 1, an EWG valve 1, an EWG motor 2, and an EWG control unit 3. In the present embodiment, "EWG" is short for "electric waste gate."

The EWG valve 1 is a wastegate valve that is provided on a bypass passage for engine exhaust gas in a supercharger, and adjusts a supercharging pressure of combustion air supplied to an engine. That is, when a degree of opening of the EWG valve 1 is increased, the supercharging pressure is reduced. In contrast, when the degree of opening of the EWG valve 1 is reduced, the supercharging pressure is increased. This EWG valve 1 is mechanically connected to the EWG motor 2 via a predetermined coupling mechanism, and the degree of opening thereof is adjusted (operated) by a driving force of the EWG motor 2.

Here, the degree of opening of the EWG valve 1 is a physical amount regulated by a position (a lift amount) of a valve body relative to a valve seat in the EWG valve 1. That is, when the lift amount is increased, that is, when a distance of the valve body from the valve seat is increased, the degree of opening of the EWG valve 1 is increased. In contrast, when the lift amount is reduced, that is, when the distance of the valve body from the valve seat is reduced, the degree of opening of the EWG valve 1 is reduced.

The EWG motor 2 is an actuator that drives the EWG valve 1, for instance, a direct current motor. The EWG motor 2 includes a lift sensor 2a that outputs a voltage indicating the lift amount of the EWG valve 1 as a sensor signal (a voltage signal). This EWG motor 2 is operated on the basis of a drive signal input from the EWG control unit 3, and operates the degree of opening of the EWG valve 1. The EWG motor 2 constitutes a drive mechanism in the present embodiment along with the above coupling mechanism. The sensor signal is a degree-of-opening signal indicating the degree of opening of the EWG valve 1 (the wastegate valve).

The EWG control unit 3 is a valve control device in the present embodiment, and operates the degree of opening of the EWG valve 1 by controlling the EWG motor 2. The EWG control unit 3 is one control functional element in an engine ECU, acquires the sensor signal from the lift sensor 2a, and acquires a variety of information (engine ECU information) from a master control functional element constituting a master control system in the engine ECU. The EWG control unit 3 generates the drive signal on the basis of the engine ECU information and the sensor signal, and thereby controls the EWG motor 2.

The engine ECU information is an instruction signal of the engine ECU provided outside the EWG control unit 3 or a signal that indicates an engine operating state, and is for instance a target lift amount, an IG ON signal, an engine water temperature signal, and water temperature sensor failure signal. This EWG control unit 3 has feedback control of the EWG motor 2 on the basis of the engine ECU information and an actual lift amount (a real lift amount) in the EWG valve 1.

The target lift amount is a control target value indicating a degree-of-opening target of the EWG valve 1. The IG ON signal is a signal indicating an ON/OFF state of an ignition switch or a startup signal indicating a startup state of an engine. The engine water temperature signal is a signal indicating an engine coolant temperature detected by a water temperature sensor (a temperature sensor) provided for the engine. Further, a failure of the water temperature sensor is a signal indicating that the water temperature sensor has failed.

Figure 2:
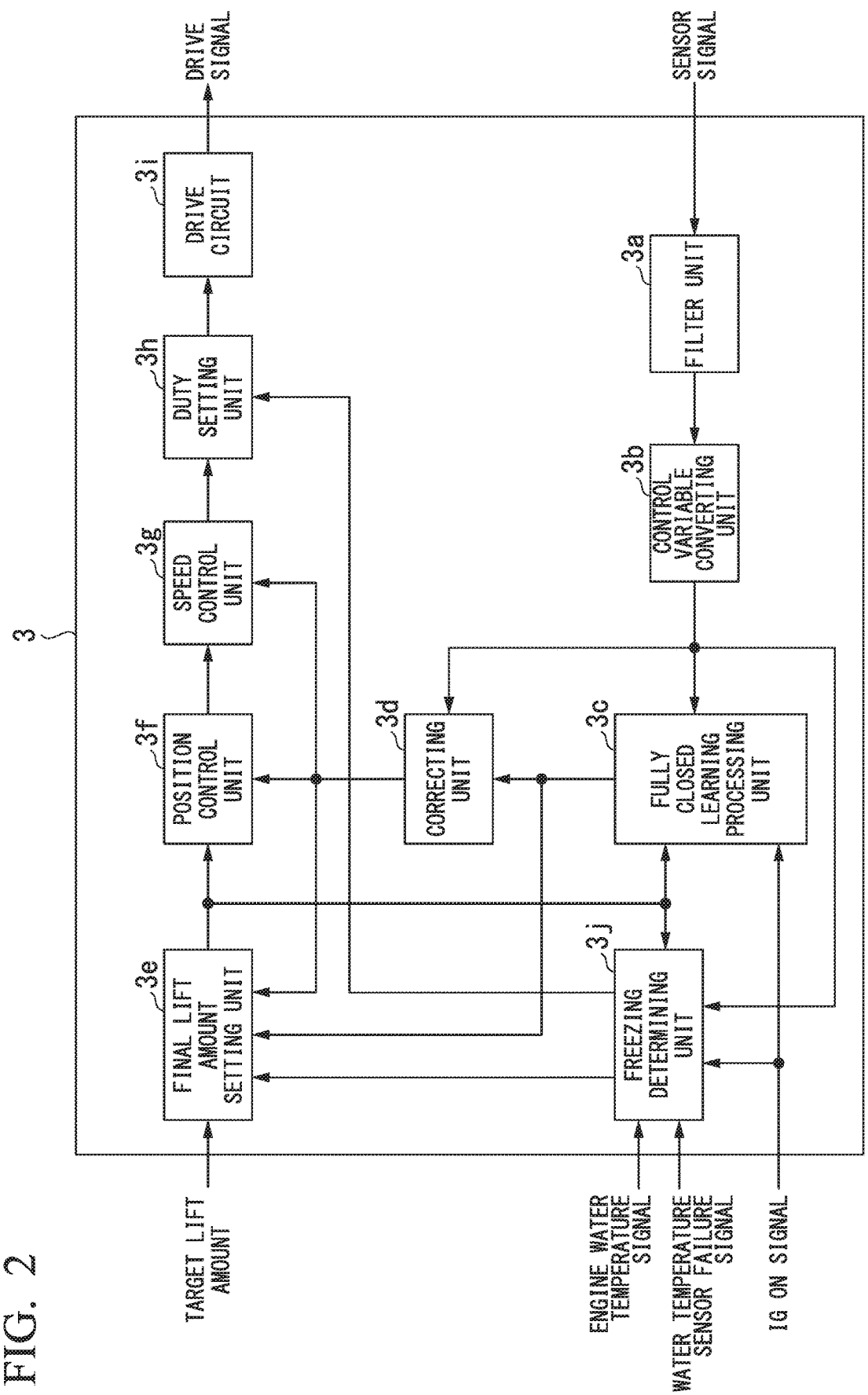
FIG. 2 is a block diagram illustrating a functional constitution of a valve control device according to the embodiment of the present invention.

As illustrated in FIG. 2, this EWG control unit 3 includes a filter unit 3a, a control variable converting unit 3b, a fully closed learning processing unit 3c, a correcting unit 3d, a final lift amount setting unit 3e, a position control unit 3f, a speed control unit 3g, a DUTY setting unit 3h, a drive circuit 3i, and a freezing determining unit 3j as functional components.

Among these functional components, the filter unit 3a, the control variable converting unit 3b, the fully closed learning processing unit 3c, the correcting unit 3d, the final lift amount setting unit 3e, the position control unit 3f, the speed control unit 3g, the DUTY setting unit 3h, and the drive circuit 3i, but not the freezing determining unit 3j, constitute a drive signal generating unit that generates a test drive signal for test-driving the EWG valve 1 prior to generating a normal drive signal relevant to normal driving of the EWG valve 1 (the wastegate valve) when the starting of the engine is determined on the basis of the IG ON signal (the startup signal). The freezing determining unit 3j is equivalent to an abnormality determining unit that determines whether or not an abnormality has occurred in the drive mechanism on the basis of the sensor signal (the degree-of-opening signal) during test driving of the EWG valve 1. The "DUTY" is a term indicating a duty ratio.

The filter unit 3a converts a sensor signal or an analog voltage signal, which is input from the lift sensor 2a, into a digital signal (detected voltage data), performs medial filtering (digital signal processing) on the digital signal, and outputs the result to the control variable converting unit 3b. The medial filtering is filtering used to remove noise by extracting a medium value (a median) of each predetermined amount of data with respect to detected voltage data that is time series data. The lift sensor 2a outputting the sensor signal makes it easy for various kinds of noise to overlap because it is provided for the EWG motor 2 attached to the engine, but the filter unit 3a outputs the detected voltage data, which more accurately indicates the lift amount (the degree of opening) by removing this noise, to the control variable converting unit 3b.

Here, moving average processing is generally used in the digital signal processing for removing the noise. However, since the medial filtering has higher noise removal performance than the moving average processing, the filter unit 3a adopts the medial filtering. In the present embodiment, the speed control unit 3g is provided in addition to the position control unit 3f. However, the speed control unit 3g calculates a speed control variable using a differential value of the real lift amount, and thus is easily affected by noise overlapping the real lift amount. In the present embodiment, since this speed control unit 3g is provided, the medial filtering is adopted instead of the moving average processing.

The control variable converting unit 3b converts the detected voltage data (the voltage amount) into the lift amount (the position).

The control variable converting unit 3b has, for instance, a conversion table showing a relation between the detected voltage data and the lift amount, extracts the lift amount equivalent to the detected voltage data on the basis of the conversion table, and outputs the extracted lift amount to the fully closed learning processing unit 3c. In place of the conversion table, a conversion formula showing the relation between the detected voltage data and the lift amount may be pre-stored, and the lift amount equivalent to the detected voltage data may be extracted on the basis of the conversion formula.

The fully closed learning processing unit 3c is a functional component that learns the lift amount (the seated position) as a fully closed lift amount when the valve body of the EWG valve 1 is seated on the valve seat. The fully closed lift amount varies depending on a temperature of the EWG valve 1, and thus cannot be treated as a fixed value. Due to these circumstances, the fully closed learning processing unit 3c learns the lift amount (the seated position) as the fully closed lift amount when the valve body of the EWG valve 1 is seated on the valve seat on the basis of the IG ON signal or the actual lift amount (the real lift amount) input from the control variable converting unit 3b.

Here, the fully closed lift amount includes a long-term learning value and a short-term learning value. The long-term learning value is a learning value acquired whenever the engine is started, whereas the short-term learning value is a learning value acquired whenever the valve body is seated. That is, when it is determined on the basis of the IG ON signal that the engine is started, the fully closed learning processing unit 3c stores the fully closed lift amount when the valve body of the EWG valve 1 is seated first after the engine is started as the long-term learning value. On the other hand, whenever the valve body of the EWG valve 1 is seated on the valve seat, the fully closed learning processing unit 3c stores the fully closed lift amount at that time as the short-term learning value regardless of the starting of the engine.

The fully closed learning processing unit 3c also uses the IG ON signal indicating the starting of the engine in addition to the actual lift amount (the real lift amount) input from the control variable converting unit 3b, thereby acquiring the long-term learning value, and acquires the short-term learning value on the basis of only the real lift amount input from the control variable converting unit 3b. This fully closed learning processing unit 3c outputs the long-term and short-term learning values to the final lift amount setting unit 3e, and outputs only the short-term learning value to the correcting unit 3d.

The correcting unit 3d is a functional component that compensates for the real lift amount input from the control variable converting unit 3b on the basis of the short-term learning value input from the fully closed learning processing unit 3c. That is, the correcting unit 3d takes a difference between the real lift amount and the short-term learning value, and thereby calculates a lift amount (a correction lift amount) based on the short-term learning value and outputs the correction lift amount to the position control unit 3f and the speed control unit 3g.

The final lift amount setting unit 3e sets a final target lift amount (a control target value) on the basis of the target lift amount input as a piece of engine ECU information from the engine ECU, the long-term and short-term learning values input from the fully closed learning processing unit 3c, and the correction lift amount input from the correcting unit 3d. The target lift amount is a signal designating the lift amount (the degree of opening) of the EWG valve 1 as a square-wave voltage value. With respect to this target lift amount, the final lift amount setting unit 3e performs specific processing on the target lift amount when the valve body of the EWG valve 1 is seated on the valve seat, thereby generating the final target lift amount with which the valve body can make a soft landing on the valve seat.

That is, the final lift amount setting unit 3e divides a period required until the valve body is seated after initiating movement (downward movement relative to the valve seat) for the seating of the valve body into two periods, a former period and a latter period, and generates the final target lift amount (the control target value) with which the valve body makes a soft landing on the valve seat by moving the valve body downward at a highest speed in the former period and moving the valve body relatively gently in the latter period. The final lift amount setting unit 3e sets a switching point (a soft landing initiation lift amount) between the former and latter periods and a final stop target lift amount of the valve body on the basis of the long-term learning value and the short-term learning value.

Here, the final target lift amount is a control target value (a normal final target lift amount) for ordinarily driving the EWG valve 1. The final lift amount setting unit 3e generates a final target lift amount (a test final target lift amount) for test-driving the EWG valve 1 aside from the normal driving of the EWG valve 1. That is, when a test signal generating instruction is input from the freezing determining unit 3j, the final lift amount setting unit 3e generates the test final target lift amount. Although details will be described below, the test final target lift amount is for raising the lift amount to a predetermined test lift amount, then maintaining the test lift amount for a certain period of time, and initiating the soft landing thereafter.

The position control unit 3f generates a position operation amount and outputs it to the speed control unit 3g. That is, the position control unit 3f performs well-known PID processing on a difference between the final target lift amount (the control target value) input from the final lift amount setting unit 3e and the correction lift amount input from the correcting unit 3d, thereby generating the position operation amount. Details of the PID processing, that is, processing content or gains, are properly set depending on required performance (control performance) in the control of the EWG valve 1.

The speed control unit 3g generates a speed operation amount on the basis of the position operation amount input from the position control unit 3f and the correction lift amount input from the correcting unit 3d, and outputs the speed operation amount to the DUTY setting unit 3h. That is, the speed control unit 3g performs limiter processing on the position operation amount input from the position control unit 3f, and performs differential processing on the correction lift amount input from the correcting unit 3d. The speed control unit 3g performs well-known PID processing on a difference between the position operation amount after the limiter processing and a lift speed obtained by the differential processing, thereby generating the speed operation amount. The processing content or the gains are properly set for the PID processing in the speed control unit 3g depending on the required performance (the control performance) in the control of the EWG valve 1.

The DUTY setting unit 3h and the drive circuit 3i will be described. For convenience, the drive circuit 3i will be described first. The drive circuit 3i is a motor drive circuit having a pulse drive system. That is, the drive circuit 3i converts direct current power into pulse width modulation (PWM) power on the basis of a PWM signal input from the DUTY setting unit 3h as a control signal, and outputs the PWM power to the EWG motor 2 as a drive signal. The drive signal which the drive circuit 3i generates on the basis of the normal final target lift amount is a normal drive signal, and the drive signal which the drive circuit 3i generates on the basis of the test final target lift amount is a test drive signal.

On the other hand, the DUTY setting unit 3h is a PWM signal generator for generating the PWM signal on the basis of the speed operation amount input from the speed control unit 3g. The DUTY setting unit 3h has a function (as a DUTY limiter) of performing the limiter processing on the speed operation amount.

That is, the DUTY setting unit 3h performs the limiter processing on the speed operation amount, thereby generating the PWM signal that regulates an upper limit of the duty ratio of the PWM signal, that is, a highest rotational speed of the EWG motor 2. In addition, when a DUTY limit instruction is input from the freezing determining unit 3j, the DUTY setting unit 3h limits the DUTY of the PWM signal to a predetermined value regardless of the speed operation amount input from the speed control unit 3g.

The freezing determining unit 3j generates the test signal generating instruction and the DUTY limit instruction on the basis of the IG ON signal, the engine water temperature signal (the temperature signal) and the water temperature sensor failure signal input from the engine ECU, the real lift amount input from the control variable converting unit, and the final target lift amount input from the final lift amount setting unit 3e. The freezing determining unit 3j is the abnormality determining unit in the present embodiment.

That is, when the starting of the engine is determined on the basis of the IG ON signal, the freezing determining unit 3j outputs the test signal generating instruction, which instructs the generation of the test target lift amount prior to the final target lift amount relevant to the normal driving of the EWG valve 1, to the final lift amount setting unit 3e. The freezing determining unit 3j determines whether or not a freezing abnormality in the drive mechanism of the EWG valve 1 has occurred on the basis of the real lift amount during test driving of the EWG valve 1 based on the test target lift amount, and outputs the DUTY limit instruction to the DUTY setting unit 3h when the freezing abnormality has occurred. Details of this freezing determining unit 3j will be described in the following operation description.

The constitutions of the valve system and the valve control device according to the present embodiment have been described above. In the present embodiment, the valve control device is a control device that uses the EWG valve 1 (the wastegate valve) provided along with the supercharger.

Next, operations of the valve system and the valve control device configured in this way will be described in detail with further reference to FIGS. 3 and 4.

In the present embodiment, a basic operation (a normal operation) of the EWG control unit 3 (the valve control device) is to generate a drive signal on the basis of a feedback control technique, and a target lift amount and a sensor signal. The EWG motor 2 is operated on the basis of the drive signal, and thereby a degree of opening of the EWG valve 1 is adjusted according to the target lift amount.

The EWG control unit 3 performs a test operation ahead of this basic operation (this normal operation) when the engine is started. In the test operation, it is determined whether or not freezing abnormality has occurred in the above drive mechanism of the EWG valve 1, that is, in the EWG motor 2 and the coupling mechanism, and an operation of the EWG motor 2 is controlled on the basis of a result of the determination. In the following operation description, for convenience of description, the basic operation (the normal operation) will be described first, and then the test operation will be described.

The final lift amount setting unit 3e sets a final target lift amount (a control target value) for normal driving on the basis of the target lift amount input from the engine ECU (the master control system), the long-term learning value and the short-term learning value input from the fully closed learning processing unit 3c, and the correction lift amount input from the correcting unit 3d in the normal driving of the EWG valve 1. That is, the final lift amount setting unit 3e uses the long-term learning value and the short-term learning value with respect to the target lift amount that is the square-wave voltage value, so that a falling section when the EWG valve 1 is fully closed and a low level section in which a lift amount at the time of full closure is designated are corrected. Thereby, the final lift amount setting unit 3e generates a normal final target lift amount Ma as illustrated in FIG. 3.

Figure 3:
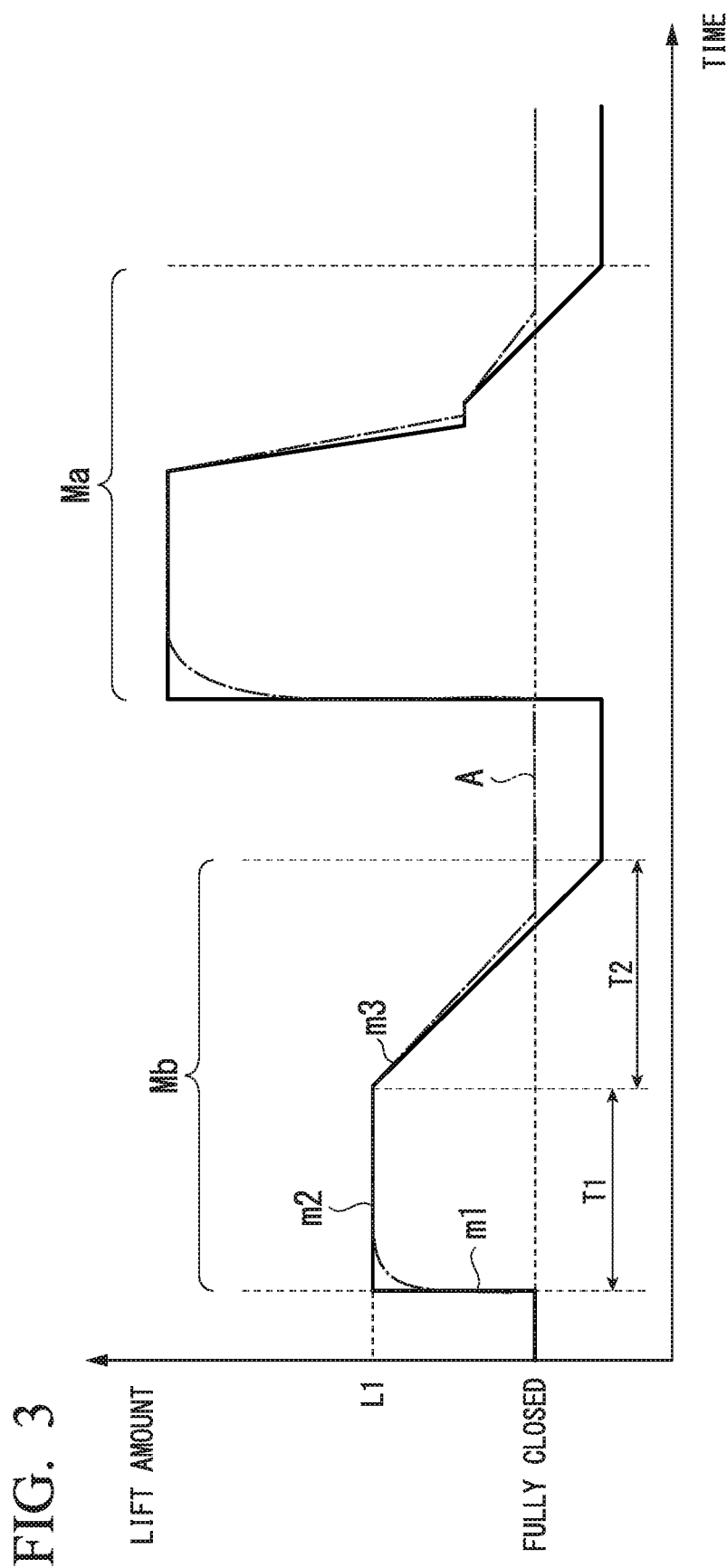
FIG. 3 is a timing chart illustrating a control operation of the valve control device according to the embodiment of the present invention.

In FIG. 3, a waveform A indicated by a dot-and-dash line shows a change in the real lift amount to the normal final target lift amount Ma.

To be more specific, the final lift amount setting unit 3e sets an initiation lift amount (a soft landing initiation lift amount Lk) and a stop target lift amount Lt when the valve body of the EWG valve 1 is soft-landed on the valve seat on the basis of a long-term learning value, a short-term learning value, and a defined value (a constant) as follows.

$Lk$=Long-term learning value−Short-term learning value+Defined value $Lt$=Long-term learning value−Short-term learning value−Defined value The final lift amount setting unit 3e monitors correction lift amounts that are input from the correcting unit 3d in turn, and outputs a control target value reaching the stop target lift amount Lt at a predetermined slope (speed) when the correction lift amount is consistent with the soft landing initiation lift amount Lk.

Here, the soft landing initiation lift amount Lk and the stop target lift amount Lt are defined by the long-term learning value, the short-term learning value, and the defined value (the constant). However, since the correction lift amount is given as the difference between the real lift amount and the short-term learning value as described above, the soft landing initiation lift amount Lk and the stop target lift amount Lt are amounts that are substantially defined only by the long-term learning value and the defined value (constant). When the final lift amount setting unit 3e is configured to introduce the real lift amount rather than the correction lift amount, the soft landing initiation lift amount Lk becomes (Long-term learning value+Defined value), and the stop target lift amount Lt becomes (Long-term learning value−Defined value). The soft landing initiation lift amount Lk and the stop target lift amount Lt are defined only by the long-term learning value and the defined value (the constant).

On the other hand, the filter unit 3a sequentially samples sensor signals (analog signals) input from the lift sensor 2a, converts the results into detected voltage data (digital signals), and performs medial filtering on the detected voltage data. Since a noise component derived from the sensor signal overlapping the detected voltage data is removed by the medial filtering, the detected voltage data becomes a signal that more accurately indicates the lift amount. The detected voltage data (the voltage) from which noise is removed by the medial filtering is converted into the lift amount in the control variable converting unit 3b, and is output to the fully closed learning processing unit 3c, the correcting unit 3d, and the freezing determining unit 3j.

Among the real lift amounts that are sequentially input from the control variable converting unit 3b whenever the engine is started using the IG ON signal input from the engine ECU as a trigger signal, the lift amount when the valve body of the EWG valve 1 is seated on the valve seat is learned as the long-term learning value by the fully closed learning processing unit 3c. That is, the starting of the engine is determined on the basis of the IG ON signal by the fully closed learning processing unit 3c, and the fully closed lift amount whenever the valve body of the EWG valve 1 is seated on the valve seat is acquired and updated as the short-term learning value by the fully closed learning processing unit 3c.

The fully closed learning processing unit 3c stores the long-term learning value when the engine is stopped in a non-volatile memory, and then outputs the stored long-term learning value as an initial value of the short-term learning value when the engine is started.

The long-term and short-term learning values acquired by this learning process are provided to the final lift amount setting unit 3e, and are used to generate the above final target lift amount, while the short-term learning value is supplied to the correcting unit 3d. In the correcting unit 3d, the short-term learning value is subtracted from the real lift amount, and the correction lift amount is generated.

The position control unit 3f generates a position operation amount on the basis of a difference between the final target lift amount and the correction lift amount and output the result to the speed control unit 3g. The speed control unit 3g generates a speed operation amount on the basis of a difference between the position operation amount and the correction lift amount. The DUTY setting unit 3h generates a PWM signal for which a duty ratio is set depending on the speed operation amount, and outputs the result to the drive circuit 3i. The drive circuit 3i generates a drive signal having a wave height value appropriate for the PWM signal to drive the EWG motor 2. A speed limiter is set for the speed control unit 3g, and a DUTY limiter is set for the DUTY setting unit 3h. Thus, the highest rotational speed of the EWG motor 2 is reliably limited within an allowable range.

In regard to this basic operation (this normal operation), a test operation is as follows. That is, when a test signal generating instruction is input from the freezing determining unit 3j, the final lift amount setting unit 3e also generates a test target lift amount Mb as illustrated in FIG. 3. When the starting of the engine is determined on the basis of the IG ON signal, the freezing determining unit 3j outputs the test signal generating instruction to the final lift amount setting unit 3e, so that the test target lift amount Mb is generated before the normal final target lift amount Ma as illustrated in FIG. 3.

In this test target lift amount Mb, after the EWG valve 1 is raised from a lift amount when the engine is started to a predetermined test lift amount L1, the EWG valve 1 maintains the test lift amount L1 for a predetermined period (a determination period T1), and is kept in a fully closed state via a soft landing period T2 for which it is subsequently lowered at a constant speed. That is, the test target lift amount Mb is constituted of a rising unit m1 in which the EWG valve 1 is abruptly raised from a starting initial value to the test lift amount L1, a flat section m2 in which the EWG valve 1 maintains the test lift amount L1 for the predetermined period T1, and a soft landing unit m3 in which the EWG valve 1 is lowered at a constant speed for the soft landing period T2.

When it is determined on the basis of the IG ON signal that the starting of the engine is stopped, the freezing determining unit 3j generates a final target lift amount (a stop target lift amount) similar to the test target lift amount Mb, thereby keeping the EWG valve 1 in a fully closed state. Therefore, the lift amount (the starting initial value) when the engine is started is a lift amount equivalent to the fully closed state of the EWG valve 1.

When the freezing abnormality does not occur in the drive mechanism (the EWG motor 2 and the coupling mechanism) of the EWG valve 1, the position control unit 3f, the speed control unit 3g, the DUTY setting unit 3h, and the drive circuit 3i are operated in the same way as in the above basic operation (the normal operation) on the basis of the above test target lift amount Mb, so that the real lift amount varies along the test target lift amount Mb as illustrated in FIG. 3. However, when the freezing abnormality has occurred in the drive mechanism of the EWG valve 1, the real lift amount does not vary along the test target lift amount Mb as illustrated in an uppermost stage of FIG. 4.

The freezing determining unit 3j evaluates the real lift amounts input sequentially from the control variable converting unit 3b as follows, thereby determining whether or not the freezing abnormality has occurred in the drive mechanism of the EWG valve 1.

Figure 4:
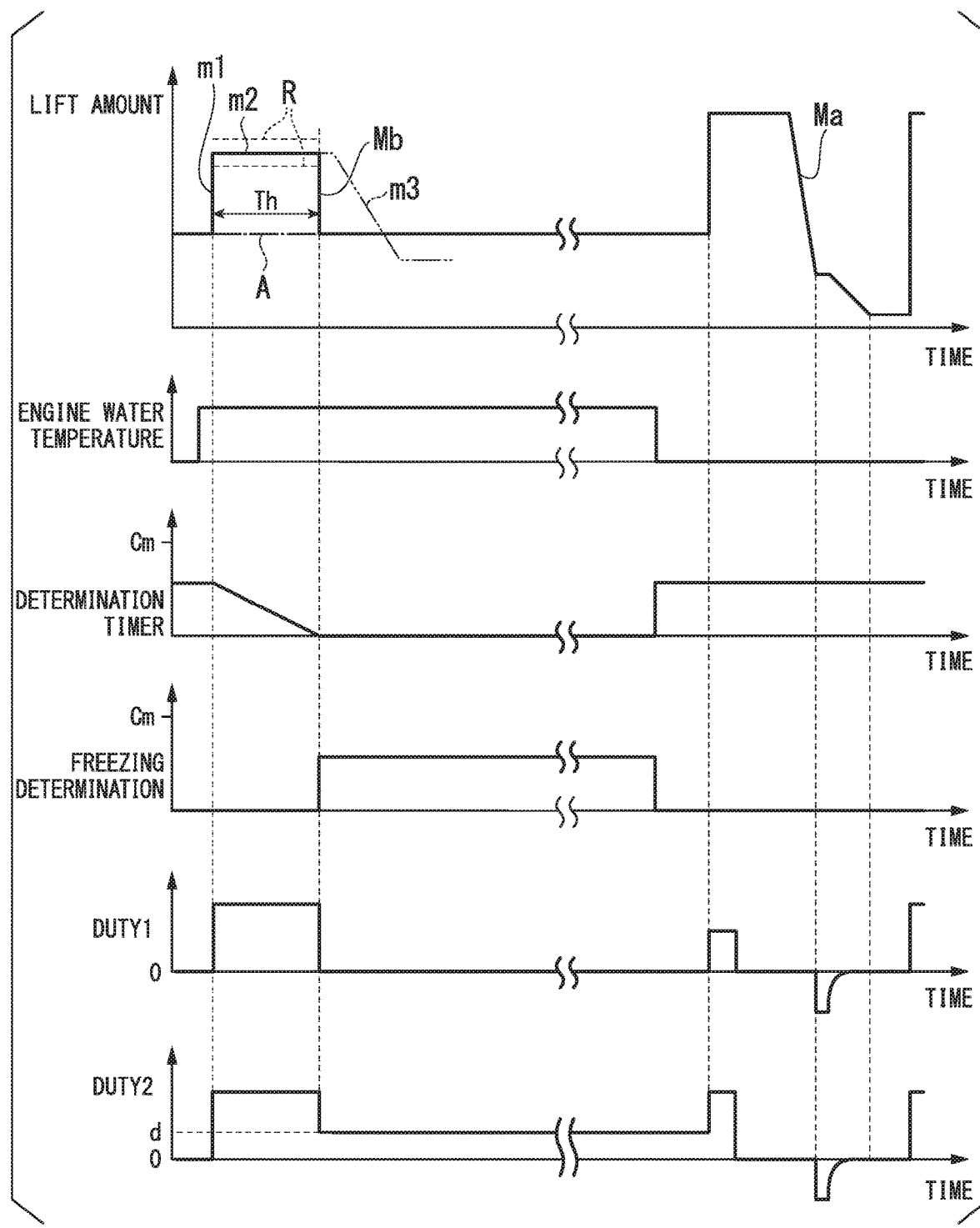
FIG. 4 is a timing chart illustrating the fully closed learning process in the embodiment of the present invention.

That is, as shown in a waveform of a second stage of FIG. 4, the freezing determining unit 3j determines whether or not a temperature of a coolant (a coolant temperature) of the engine is higher than a predetermined threshold temperature (a freezing temperature) on the basis of the engine water temperature signal (the temperature signal) input from the engine ECU. When the coolant temperature is lower than or equal to the freezing temperature, the freezing determining unit 3j is synchronized with the rising unit m1 as shown in a waveform of a third stage of FIG. 4, and initiates a lapse of time of an evaluation period Th (a predetermined period) from a determination timer. The evaluation period Th is a period that is slightly shorter than the predetermined period T1 at the above test target lift amount Mb.

When the freezing determining unit 3j initiates the lapse of time of the evaluation period Th with the determination timer, the freezing determining unit 3j determines (follow-up determination) whether or not a difference between the test target lift amount Mb input from the final lift amount setting unit 3e and the real lift amount input from the control variable converting unit is within a range of a predetermined evaluation threshold R. When the freezing abnormality has occurred in the drive mechanism of the EWG valve 1, the drive mechanism is in a state in which it cannot operate the degree of opening of the EWG valve 1 due to freezing, and a result of the follow-up determination becomes "No." As shown in a waveform of a fourth stage of FIG. 4, the freezing determining unit 3j confirms a result of the freezing determination with a timing at which the lapse of time of the evaluation period Th (the predetermined period) with the determination timer is completed.

Here, in the evaluation period Th, the real lift amount (a waveform A of the uppermost stage of FIG. 4) does not perfectly follow the test target lift amount Mb, and thus the speed operation amount which the speed control unit 3g outputs to the DUTY setting unit 3h becomes a maximum value. As a result, as shown in a waveform of a fifth stage of FIG. 4, the DUTY setting unit 3h generates a PWM signal having a maximum duty ratio (100%) for the evaluation period Th, and outputs the result to the drive circuit 3i.

When it is confirmed that the freezing abnormality has occurred after this evaluation period Th is completed, the freezing determining unit 3j outputs an instruction to stop generating the test target lift amount Mb to the final lift amount setting unit 3e. As a result, as shown in the waveform of the uppermost stage of FIG. 4, the final lift amount setting unit 3e stops generating the test target lift amount Mb, and sets the correction lift amount, which is input from the correcting unit 3d during the stop, as the final target lift amount.

The freezing determining unit 3j outputs a DUTY limit instruction to the DUTY setting unit 3h, thereby changing the duty ratio of the PWM signal output to the drive circuit 3i from a maximum duty ratio (100%) to a minimum duty ratio (0%) as shown in a waveform of a fifth stage of FIG. 4. That is, when the freezing abnormality is confirmed, the freezing determining unit 3j stops generating the test drive signal and the normal drive signal.

According to a countermeasure when this freezing abnormality is confirmed, the EWG motor 2 is prevented from being continuously operated with a drive signal having a maximum amplitude corresponding to the maximum duty ratio (100%), and thus a fear of causing damage to the EWG motor 2 can be avoided.

In this test operation, when an abnormality in the water temperature sensor in the engine is notified of by a water temperature sensor failure signal, the freezing determining unit 3j does not perform the follow-up determination, and changes setting of the maximum duty ratio (100%) to a predetermined intermediate duty ratio (e.g., 40%) rather than the minimum duty ratio (0%) at a point in time at which the determination timer completes the lapse of time of the evaluation period Th as shown in the waveform of the lowermost stage in FIG. 4. This intermediate duty ratio is equivalent to a level of the drive signal that can be continuously supplied to the EWG motor 2.

According to a countermeasure in the event of a failure of this water temperature sensor, the operation of the EWG motor 2 is not completely stopped, and the EWG motor 2 is operated by the drive signal on the basis of the intermediate duty ratio (e.g., 40%) without causing damage to the EWG motor 2 despite continuous supply. Thus, the fear of causing damage to the EWG motor 2 can be avoided, and although an operation speed is reduced, the degree of opening of the EWG valve 1 can be adjusted by operating the EWG motor 2.

As described above, the EWG control unit 3 controls the EWG motor 2 in the case of the determination of the freezing abnormality in the drive mechanism of the EWG valve 1 and the freezing abnormality thereof, but an ambient temperature of the engine rises so that the freezing abnormality can be fixed. Therefore, when it is determined on the basis of the engine water temperature signal that, even once the freezing abnormality is confirmed, the coolant temperature of the engine is higher than the freezing temperature, the freezing determining unit 3j outputs an instruction to initiate the generation of the normal final target lift amount Ma to the final lift amount setting unit 3e, and outputs an instruction to release a DUTY limit to the DUTY setting unit 3h. Thereby, as illustrated in FIG. 4, the normal final target lift amount Ma is generated, and thus the EWG control unit 3 transitions from the test operation to the basic operation (the normal operation). The target lift amount when this generation is resumed is the correction lift amount set when the generation of the test target lift amount Mb is stopped.

As described above, when the water temperature sensor fails, the duty ratio of the PWM signal is limited to a predetermined intermediate duty ratio. However, when the EWG valve 1 is changed from a frozen state to a thawed state, the real lift amount begins to approach the final target lift amount. When the duty ratio of the PWM signal at this time is lower than the limited predetermined intermediate duty ratio by an absolute value, the freezing determining unit 3j outputs the instruction to release the DUTY limit to the DUTY setting unit 3h, and releases a limit to the duty ratio.

Therefore, according to the present embodiment, since the freezing abnormality in the EWG valve 1 is evaluated using the test target lift amount Mb generated before the normal final target lift amount Ma, it is possible to cope with the freezing abnormality in the drive mechanism of the EWG valve 1 without using a separate valve.

The present invention is not limited to the above embodiment, and for example the following modifications are considered.

(1) In the above embodiment, the EWG valve 1 (the wastegate valve) is used as the control target valve, but the present invention is not limited thereto. The present invention can be applied to various valves other than the EWG valve 1 (the wastegate valve) in the engine, that is, various flow control valves or on-off valves.

(2) In the above embodiment, the freezing determining unit 3j determines the freezing abnormality, but the present invention is not limited thereto. For example, the function of the freezing determining unit 3j may be given to the final lift amount setting unit 3e.

(3) In the above embodiment, when the freezing abnormality is confirmed, the maximum duty ratio (100%) is changed to the minimum duty ratio (0%), but the present invention is not limited thereto. For example, in place of the duty ratio, or in addition to the duty ratio, the position operation amount or the speed operation amount may be limited to a minimum value.

REFERENCES SIGNS LIST

1 EWG valve (valve)
2 EWG motor (drive mechanism)
2a Lift sensor
3 EWG control unit
3a Filter unit
3b Control variable converting unit
3c Fully closed learning processing unit
3d Correcting unit
3e Final lift amount setting unit
3f Position control unit
3g Speed control unit
3h DUTY setting unit
3i Drive circuit
3j Freezing determining unit (abnormality determining unit)

The invention claimed is:

1. A valve control device configured to control a drive mechanism of a valve on the basis of a degree-of-opening signal for the valve and a startup signal for an engine, the valve control device comprising:
    a drive circuit configured to,
        when it is determined on the basis of the startup signal that the engine is stopped, generate a drive signal that puts the valve in a fully closed state, and
        when it is determined on the basis of the startup signal that the engine is started, generate a test drive signal for test-driving the valve before generation of a normal drive signal associated with normal driving of the valve; and processor configured to determine, on the basis of the degree-of-opening signal during the test driving, whether or not an abnormality has occurred in the drive mechanism, wherein, when the processor determines that the abnormality has occurred in the drive mechanism, the drive circuit stops generating the test drive signal and the normal drive signal, and wherein the valve is a wastegate valve provided for a supercharger of the engine.

2. The valve control device according to claim 1, wherein the processor determines whether or not a coolant temperature of the engine is lower than or equal to a freezing temperature on the basis of a temperature signal indicating the coolant temperature, and determines that a freezing abnormality has occurred in the drive mechanism when the coolant temperature is lower than or equal to the freezing temperature and the degree of opening of the valve does not follow a control target value during the test driving for a predetermined period.

3. The valve control device according to claim 1, wherein the processor determines whether or not a temperature sensor for detecting a coolant temperature of the engine is abnormal on the basis of a sensor failure signal indicating an abnormality in the temperature sensor, and causes the drive circuit to generate a drive signal having a level at which the drive signal is able to be continuously supplied to the drive mechanism when the temperature sensor is abnormal.

4. The valve control device according to claim 2, wherein, when the processor determines the freezing abnormality, the drive circuit stops generating the test drive signal and the normal drive signal, and then resumes the generation of the normal drive signal when it is determined on the basis of the temperature signal that the coolant temperature is higher than the freezing temperature.

5. A valve system comprising:
a valve;
a drive mechanism; and
the valve control device according to claim 1.

6. A valve control device configured to control a drive mechanism of a valve on the basis of a degree-of-opening signal for the valve and a startup signal for an engine, the valve control device comprising:

a drive circuit configured to, when it is determined on the basis of the startup signal that the engine is started, generate a test drive signal for test-driving the valve before generation of a normal drive signal associated with normal driving of the valve; and processor configured to determine, on the basis of the degree-of-opening signal during the test driving, whether or not an abnormality has occurred in the drive mechanism, wherein, when the processor determines that the abnormality has occurred in the drive mechanism, the drive circuit stops generating the test drive signal and the normal drive signal, wherein the processor determines whether or not a temperature sensor for detecting a coolant temperature of the engine is abnormal on the basis of a sensor failure signal indicating an abnormality in the temperature sensor, and causes the drive circuit to generate a drive signal having a level at which the drive signal is able to be continuously supplied to the drive mechanism when the temperature sensor is abnormal.

* * * * *